US011694200B2

(12) United States Patent
Grassadonia et al.

(10) Patent No.: US 11,694,200 B2
(45) Date of Patent: *Jul. 4, 2023

(54) SECURE ACCOUNT CREATION

(71) Applicant: Block, Inc., San Francisco, CA (US)

(72) Inventors: Brian Grassadonia, San Francisco, CA (US); Michael Moring, San Francisco, CA (US); Robert Andersen, Brooklyn, NY (US); Daniele Perito, San Francisco, CA (US); Ayokunle Omojola, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/194,159

(22) Filed: Mar. 5, 2021

(65) Prior Publication Data

US 2021/0192502 A1 Jun. 24, 2021

Related U.S. Application Data

(63) Continuation of application No. 16/659,441, filed on Oct. 21, 2019, now Pat. No. 10,956,906, which is a
(Continued)

(51) Int. Cl.
*G06Q 20/22* (2012.01)
*G06Q 20/40* (2012.01)
(Continued)

(52) U.S. Cl.
CPC ......... *G06Q 20/385* (2013.01); *G06Q 20/223* (2013.01); *G06Q 20/26* (2013.01);
(Continued)

(58) Field of Classification Search
None
See application file for complete search history.

(56) References Cited

U.S. PATENT DOCUMENTS 4,764,666 A * 8/1988 Bergeron ............... G07F 17/32
463/43
5,999,941 A 12/1999 Andersen
(Continued)

FOREIGN PATENT DOCUMENTS

WO 01/59597 A1 8/2001
WO 03/001866 A1 1/2003
(Continued)

OTHER PUBLICATIONS

S. von Solms, "An investigation into credit card information disclosure through Point of Sale purchases," 2015 Information Security for South Africa (ISSA), 2015, pp. 1-8, (POS). (Year: 2015).*
(Continued)

*Primary Examiner* — Chikaodinaka Ojiaku
(74) *Attorney, Agent, or Firm* — FIG. 1 Patents

(57) ABSTRACT

In one embodiment, a payment service system-implemented method of assigning payment card numbers for individual user accounts associated with the payment service system includes receiving a request, in the context of an authorization for a payment transaction, to assign a payment card number to a user account associated with a user of the payment service system. The method includes retrieving, from a database associated with the payment service system, an account record associated with the user account. The method includes determining that the user account is not associated with an active payment card number. The method includes identifying an unassigned payment card number and modifying the account record to assign the unassigned payment card number to the user account as an active payment card number. The method includes authorizing the payment transaction using the active payment card number, causing a modification to an account balance of the user account.

20 Claims, 5 Drawing Sheets

Related U.S. Application Data continuation of application No. 15/640,321, filed on Jun. 30, 2017, now Pat. No. 10,453,056, which is a continuation of application No. 15/638,190, filed on Jun. 29, 2017, now abandoned.

(51) Int. Cl.
  *G06Q 20/38* (2012.01)
  *G06Q 20/26* (2012.01)
  *G06Q 20/32* (2012.01)
  *G06Q 20/34* (2012.01)

(52) U.S. Cl.
  CPC ..... *G06Q 20/3221* (2013.01); *G06Q 20/3263* (2020.05); *G06Q 20/351* (2013.01); *G06Q 20/355* (2013.01); *G06Q 20/3821* (2013.01); *G06Q 20/4014* (2013.01)

(56) References Cited

U.S. PATENT DOCUMENTS

| | | | |
|---|---|---|---|
| 6,144,948 A * | 11/2000 | Walker | G06Q 40/025 705/38 |
| 6,315,196 B1 * | 11/2001 | Bachman | G07F 7/08 705/41 |
| 6,786,400 B1 | 9/2004 | Bucci | |
| 7,249,093 B1 | 7/2007 | King | |
| 7,552,087 B2 | 6/2009 | Schultz et al. | |
| 7,827,108 B2 * | 11/2010 | Perlman | G06Q 20/40 235/379 |
| 8,041,640 B2 * | 10/2011 | Stone | G06Q 40/02 705/45 |
| 8,255,278 B1 * | 8/2012 | Young | G06Q 20/322 705/17 |
| 8,260,694 B1 | 9/2012 | Lauer et al. | |
| 8,612,317 B1 | 12/2013 | Harman et al. | |
| 8,619,658 B2 | 12/2013 | Sammour et al. | |
| 8,640,946 B1 | 2/2014 | Block et al. | |
| 8,660,943 B1 | 2/2014 | Chirehdast | |
| 8,762,210 B2 | 6/2014 | Balasubramanian | |
| 8,831,677 B2 | 9/2014 | Villa-Real | |
| 8,919,658 B2 | 12/2014 | Diamond | |
| 8,996,417 B1 | 3/2015 | Channakeshava | |
| 9,082,119 B2 * | 7/2015 | Ortiz | G06Q 20/3829 |
| 9,129,464 B2 | 9/2015 | Hansen et al. | |
| 9,208,482 B2 | 12/2015 | Laracey | |
| 9,224,140 B2 | 12/2015 | Griffin et al. | |
| 9,258,296 B2 * | 2/2016 | Juthani | H04L 63/0838 |
| 9,305,295 B2 | 4/2016 | Laracey | |
| 9,400,978 B2 | 7/2016 | Laracey | |
| 9,811,810 B1 | 11/2017 | Ranganath et al. | |
| 9,836,727 B1 | 12/2017 | Brennan et al. | |
| 9,875,385 B1 * | 1/2018 | Humphreys | G06Q 30/0635 |
| 10,169,748 B2 | 1/2019 | Balasubramanian | |
| 10,210,569 B1 | 2/2019 | Kim et al. | |
| 10,296,903 B2 * | 5/2019 | Keresman, III | G06Q 20/105 |
| 10,304,051 B2 | 5/2019 | Laracey | |
| 10,380,564 B1 | 8/2019 | Wilson et al. | |
| 10,387,876 B1 | 8/2019 | Buentello et al. | |
| 10,453,056 B2 | 10/2019 | Grassadonia et al. | |
| 10,467,601 B1 | 11/2019 | Bricca et al. | |
| 11,023,873 B1 | 6/2021 | Grassadonia et al. | |
| 11,410,140 B1 | 8/2022 | Wilson et al. | |
| 2002/0052754 A1 | 5/2002 | Joyce et al. | |
| 2002/0120583 A1 * | 8/2002 | Keresman, III | C07D 209/88 705/65 |
| 2002/0198806 A1 * | 12/2002 | Blagg | G06Q 40/00 705/35 |
| 2003/0033582 A1 | 2/2003 | Klein et al. | |
| 2003/0055783 A1 * | 3/2003 | Cataline | G06Q 20/00 705/40 |
| 2003/0212796 A1 * | 11/2003 | Willard | G07F 7/0866 709/227 |
| 2005/0116028 A1 * | 6/2005 | Cohen | G06Q 20/28 235/379 |
| 2005/0194452 A1 * | 9/2005 | Nordentoft | G06Q 20/3415 235/492 |
| 2006/0006223 A1 * | 1/2006 | Harris | G06Q 30/06 235/379 |
| 2006/0016877 A1 * | 1/2006 | Bonalle | G07F 7/1008 235/382 |
| 2006/0253340 A1 | 11/2006 | Levchin et al. | |
| 2006/0277271 A1 * | 12/2006 | Morse | H04L 67/5681 709/227 |
| 2007/0005498 A1 * | 1/2007 | Cataline | G06Q 40/02 705/42 |
| 2007/0050258 A1 | 3/2007 | Dohse | |
| 2007/0124238 A1 | 5/2007 | Hogg et al. | |
| 2007/0131759 A1 * | 6/2007 | Cox | G06K 19/077 235/383 |
| 2007/0162387 A1 * | 7/2007 | Cataline | G06Q 20/10 705/40 |
| 2008/0120218 A1 | 5/2008 | Reid et al. | |
| 2008/0243702 A1 | 10/2008 | Hart et al. | |
| 2008/0301049 A1 * | 12/2008 | Dyson | G06Q 40/00 705/42 |
| 2009/0114716 A1 * | 5/2009 | Ramachandran | G07F 19/20 235/379 |
| 2009/0164370 A1 * | 6/2009 | Sorbe | G06Q 20/102 705/40 |
| 2009/0271278 A1 * | 10/2009 | Bishop | G06Q 20/403 235/380 |
| 2009/0287564 A1 * | 11/2009 | Bishop | G06Q 20/04 705/17 |
| 2009/0287565 A1 * | 11/2009 | Bishop | G06Q 40/04 707/E17.014 |
| 2009/0289106 A1 * | 11/2009 | Bishop | G06Q 20/20 235/379 |
| 2009/0299841 A1 * | 12/2009 | Bishop | G06Q 20/405 707/E17.014 |
| 2010/0023453 A1 * | 1/2010 | Keresman, III | G06F 21/34 705/41 |
| 2010/0030698 A1 * | 2/2010 | Goodin | G06Q 20/3821 705/76 |
| 2010/0051686 A1 | 3/2010 | Obi | |
| 2010/0114764 A1 * | 5/2010 | Cataline | B01F 31/651 705/40 |
| 2010/0131408 A1 * | 5/2010 | Perlman | G06Q 20/10 705/35 |
| 2011/0035320 A1 | 2/2011 | Perlman et al. | |
| 2011/0202466 A1 | 8/2011 | Carter | |
| 2011/0251892 A1 * | 10/2011 | Laracey | G06Q 20/20 705/16 |
| 2012/0078735 A1 * | 3/2012 | Bauer | G06Q 20/36 705/16 |
| 2012/0084135 A1 * | 4/2012 | Nissan | G06Q 30/0238 705/14.38 |
| 2012/0150740 A1 | 6/2012 | Isaacson et al. | |
| 2012/0233015 A1 * | 9/2012 | Calman | G06T 11/60 705/26.8 |
| 2012/0253913 A1 | 10/2012 | Richard | |
| 2012/0284177 A1 * | 11/2012 | Mukherjee | G06Q 20/227 705/40 |
| 2012/0290609 A1 | 11/2012 | Britt | |
| 2012/0296818 A1 * | 11/2012 | Nuzzi | G06Q 20/354 705/41 |
| 2012/0330744 A1 | 12/2012 | Aissa | |
| 2012/0330769 A1 | 12/2012 | Arceo | |
| 2013/0024364 A1 * | 1/2013 | Shrivastava | G06Q 20/12 705/39 |
| 2013/0085860 A1 * | 4/2013 | Summers | G06Q 30/02 705/14.58 |
| 2013/0103760 A1 * | 4/2013 | Golding | H04L 67/131 709/204 |
| 2013/0110658 A1 * | 5/2013 | Lyman | G06Q 20/3674 705/41 |
| 2013/0117155 A1 * | 5/2013 | Glasgo | G06Q 20/4015 705/26.35 |
| 2013/0124411 A1 | 5/2013 | Kobres et al. | |
| 2013/0132140 A1 * | 5/2013 | Amin | G06Q 30/0284 705/7.13 |

(56) References Cited

U.S. PATENT DOCUMENTS

| | | | |
|---|---|---|---|
| 2013/0132246 A1* | 5/2013 | Amin | G06Q 10/063 705/34 |
| 2013/0132274 A1* | 5/2013 | Henderson | G06Q 20/4014 705/41 |
| 2013/0132887 A1* | 5/2013 | Amin | G06F 3/0488 715/781 |
| 2013/0138500 A1* | 5/2013 | Charaniya | H04W 4/21 705/14.54 |
| 2013/0138519 A1* | 5/2013 | McKenzie | G06Q 20/204 705/17 |
| 2013/0144674 A1* | 6/2013 | Kim | G06Q 30/0267 705/7.19 |
| 2013/0144702 A1* | 6/2013 | Tabor | G06Q 30/02 705/14.26 |
| 2013/0144783 A1* | 6/2013 | Bishop | G06Q 40/12 705/42 |
| 2013/0151419 A1* | 6/2013 | Hitchcock | H04W 12/10 705/26.41 |
| 2013/0159086 A1* | 6/2013 | Richard | G06Q 30/0238 705/14.27 |
| 2013/0191199 A1* | 7/2013 | Corner | G06Q 30/02 705/14.25 |
| 2013/0198075 A1* | 8/2013 | Sakata | G06Q 40/00 705/44 |
| 2013/0198076 A1* | 8/2013 | Zambelli Hosmer | G06Q 20/4012 705/44 |
| 2013/0218683 A1* | 8/2013 | Hannan | G06Q 30/0261 705/14.58 |
| 2013/0218769 A1 | 8/2013 | Pourfallah et al. | |
| 2013/0246207 A1* | 9/2013 | Novak | G06Q 30/0641 705/26.2 |
| 2013/0246301 A1* | 9/2013 | Radhakrishnan | G06Q 30/0282 705/347 |
| 2013/0268440 A1 | 10/2013 | Tierney et al. | |
| 2013/0282490 A1* | 10/2013 | Kramer | G06Q 30/0261 705/14.58 |
| 2013/0325719 A1 | 12/2013 | Collas et al. | |
| 2013/0337905 A1 | 12/2013 | Brown | |
| 2014/0019236 A1 | 1/2014 | Argue et al. | |
| 2014/0058861 A1 | 2/2014 | Argue et al. | |
| 2014/0108173 A1* | 4/2014 | Cooper | G06Q 20/4014 705/18 |
| 2014/0114857 A1* | 4/2014 | Griggs | G06Q 40/00 705/44 |
| 2014/0129135 A1* | 5/2014 | Holden | G08G 1/205 701/420 |
| 2014/0129302 A1* | 5/2014 | Amin | G06Q 30/0641 705/13 |
| 2014/0129951 A1* | 5/2014 | Amin | G06Q 30/0635 715/738 |
| 2014/0138435 A1 | 5/2014 | Khalid | |
| 2014/0156531 A1* | 6/2014 | Poon | G06Q 20/3825 705/44 |
| 2014/0229305 A1* | 8/2014 | Ellan | G06Q 20/209 705/17 |
| 2014/0278609 A1* | 9/2014 | Capps | G06Q 20/208 705/5 |
| 2014/0279106 A1* | 9/2014 | Smelcer | G06Q 20/047 705/41 |
| 2014/0279428 A1 | 9/2014 | Holman et al. | |
| 2014/0310182 A1* | 10/2014 | Cummins | G06Q 20/3274 705/72 |
| 2015/0006270 A1* | 1/2015 | Xu | G06Q 20/405 705/14.23 |
| 2015/0026052 A1 | 1/2015 | Bodman | |
| 2015/0026059 A1 | 1/2015 | Marks et al. | |
| 2015/0031393 A1* | 1/2015 | Post | H04W 4/025 455/456.2 |
| 2015/0046307 A1 | 2/2015 | Calman et al. | |
| 2015/0046339 A1* | 2/2015 | Wong | G06Q 20/4016 705/44 |
| 2015/0106243 A1 | 4/2015 | Blackhurst et al. | |
| 2015/0120509 A1* | 4/2015 | Moring | G06Q 20/326 705/26.81 |
| 2015/0199681 A1 | 7/2015 | Salgado et al. | |
| 2015/0213426 A1 | 7/2015 | Singhal | |
| 2015/0213443 A1* | 7/2015 | Geffon | G06Q 20/3821 705/76 |
| 2015/0310419 A1* | 10/2015 | Kadaster | G06Q 20/322 705/72 |
| 2015/0332223 A1 | 11/2015 | Aaron et al. | |
| 2015/0339648 A1* | 11/2015 | Kushevsky | G06Q 20/327 705/21 |
| 2016/0189142 A1* | 6/2016 | Chandru | G06Q 20/341 705/39 |
| 2016/0321705 A1 | 11/2016 | Scheidelman | |
| 2017/0178113 A1 | 6/2017 | Mugford et al. | |
| 2017/0372289 A1* | 12/2017 | Fitzsimmons | G07G 1/0009 |
| 2018/0144307 A1* | 5/2018 | West | H04W 4/02 |
| 2018/0181927 A1 | 6/2018 | Stoeger | |
| 2019/0026716 A1* | 1/2019 | Anbukkarasu | G06Q 20/389 |
| 2019/0057373 A1 | 2/2019 | Van Veelen | |
| 2020/0134611 A1 | 4/2020 | Grassadonia et al. | |
| 2020/0342429 A1 | 10/2020 | Lamba et al. | |
| 2022/0172179 A1 | 6/2022 | Bricca et al. | |

FOREIGN PATENT DOCUMENTS

| | | |
|---|---|---|
| WO | 03/038553 A1 | 5/2003 |
| WO | 2006/076503 A1 | 7/2006 |
| WO | 2008/063810 A1 | 5/2008 |
| WO | 2019/005968 A1 | 1/2019 |

OTHER PUBLICATIONS

H. Kazem, Q. Hasan and R. Z. Khan, "Fraud/Privacy Protection in Anonymous Auction," Second International Conference on Internet Monitoring and Protection (ICIMP 2007), San Jose, CA, 2007, pp. 12-12 (Fraud) (Year: 2007).*

"Canadian Payment Landscape", Prepared for the Task Force for the Payments System Review, (Sep. 2010), pp. 1-198.

Examiner Requisition for Canadian Application No. 3060785, dated Jan. 20, 2022.

Final Office Action dated Oct. 21, 2021, for U.S. Appl. No. 15/941,909, of Bricca, G., et al., filed Mar. 30, 2018.

Non-Final Office Action dated Nov. 19, 2021, for U.S. Appl. No. 17/165,447, of Grassadonia, B., et al., filed Feb. 2, 2021.

Final Office Action dated Jun. 29, 2021, for U.S. Appl. No. 16/529,583, of Wilson, M., et al., filed Aug. 1, 2019.

Karnouskos, S., and Fokus, F., "Mobile Payment: A Journey through Existing Procedures and Standardization Initiatives", IEEE Communications Surveys & Tutorials, vol. 6, Issue 4, pp. 44-66 (Fourth Quarter 2004).

Final Office Action dated Feb. 4, 2022, for U.S. Appl. No. 17/165,447, of Grassadonia, B., et al., filed Feb. 2, 2021.

Notice of Allowance dated Apr. 20, 2022, for U.S. Appl. No. 16/529,583, of Wilson, M., et al., filed Aug. 1, 2019.

Final Office Action dated Jun. 7, 2021, for U.S. Appl. No. 17/165,447, of Grassadonia, B., et al., filed Feb. 2, 2021.

Rahman et al., "SMS Banking Transaction as an Alternative for Information, Transfer and Payment at Merchant Shops in Malaysia", IEEE, 2013 3rd International Conference on Information Technology and e-Services (ICITeS), (Mar. 24-26, 2013), 6 pages.

Alhothailty et al., "QuickCash: Secure Transfer Payment Systems", Sensors, vol. 17, (Jun. 13, 2017), pp. 1-20.

Advisory Action dated Mar. 11, 2022, for U.S. Appl. No. 17/165,447, of Grassadonia, B., et al., filed Feb. 2, 2021.

Non-Final Office Action dated Mar. 18, 2022, for U.S. Appl. No. 17/112,789, of Jowdy, J.M, filed Dec. 4, 2020.

Notice of Allowance dated Mar. 31, 2022, for U.S. Appl. No. 16/529,583, of Wilson, M., et al., filed Aug. 1, 2019.

Examiner Requisition for Canadian Application No. 3060785, dated Apr. 16, 2021.

Non-Final Office Action dated Apr. 2, 2021, for U.S. Appl. No. 17/165,447, of Grassadonia, B., et al., filed Feb. 2, 2021.

(56) References Cited

OTHER PUBLICATIONS

Non-Final Office Action dated Apr. 5, 2021, for U.S. Appl. No. 15/941,909, of Bricca, G., et al., filed Mar. 30, 2018.
"Activating vs. Registering Credit Cards," Discover, Retrieved from the Internet URL: https://www.discover.com/credit-cards/resources/registering-credit-cards, pp. 1-5 (May 25, 2018).
Hamm, T., "10 Simple Ways To Beat Impulse Buying," The Simple Dollar, Retrieved from the Internet URL: https://www.thesimpledollar.com/10-simple-ways-to-beat-impulse-buying/, pp. 1-9 (Sep. 22, 2014).
Mirembe, D.P., et al., "A Model for Electronic Money Transfer for Low Resourced Environments: M-Cash," Third International Conference on Broadband Communications, Information Technology & Biomedical Applications, pp. 389-393 (2008).
Warnick, M., "Think You can't use that your not yet activated credit card? Think Again," Sticker, dated Sep. 23, 2009, Retrieved from Internet URL: http://www.creditcards.com/credit-card-news/sticker-activate-new-credit-card-1282.php, on Aug. 30, 2017, pp. 1-6.
Kazem, H. et al., "Fraud/Privacy Protection in Anonymous Auction", Second International Conference on Internet Monitoring and Protection (ICIMP 2007), 5 pages (2007).
Non-Final Office Action dated Jan. 15, 2015, for U.S. Appl. No. 14/098,336, of Wilson, M., et al., filed Dec. 5, 2013.
Non-Final Office Action dated Sep. 10, 2015, for U.S. Appl. No. 14/098,336, of Wilson, M., et al., filed Dec. 5, 2013.
Non-Final Office Action dated Mar. 24, 2016, for U.S. Appl. No. 14/098,336, of Wilson, M., et al., filed Dec. 5, 2013.
Non-Final Office Action dated Sep. 9, 2016, for U.S. Appl. No. 14/098,336, of Wilson, M., et al., filed Dec. 5, 2013.
Final Office Action dated Feb. 24, 2017, for U.S. Appl. No. 14/098,336, of Wilson, M., et al., filed Dec. 5, 2013.
Non-Final Office Action dated Sep. 27, 2017, for U.S. Appl. No. 14/098,336, of Wilson, M., et al., filed Dec. 5, 2013.
Non-Final Office Action dated Nov. 2, 2017, for U.S. Appl. No. 14/453,526, of Jowdy, J., M., filed Aug. 6, 2014.
Non-Final Office Action dated Nov. 15, 2017, for U.S. Appl. No. 15/640,321, of Grassadonia, B., et al., filed Jun. 30, 2017.
Non-Final Office Action dated Mar. 9, 2018, for U.S. Appl. No. 14/747,805, of Kim, W., et al., filed Jun. 23, 2015.
Final Office Action dated Jun. 1, 2018, for U.S. Appl. No. 14/453,526, of Jowdy, J.M., filed Aug. 6, 2014.
Final Office Action dated Jun. 4, 2018, for U.S. Appl. No. 15/640,321, of Grassadonia, B., et al., filed Jun. 30, 2017.
Final Office Action dated Jun. 18, 2018, for U.S. Appl. No. 14/098,336, of Wilson, M., et al., filed Dec. 5, 2013.
Non-Final Office Action dated Aug. 10, 2018, for U.S. Appl. No. 15/941,797, of Bricca, G., et al., filed Mar. 30, 2018.
Notice of Allowance dated Sep. 20, 2018, for U.S. Appl. No. 14/747,805, of Kim, W., et al., filed Jun. 23, 2015.
Advisory Action dated Oct. 26, 2018, for U.S. Appl. No. 14/098,336, of Wilson, M., et al., filed Dec. 5, 2013.
Non Final Office Action dated Jan. 14, 2019, for U.S. Appl. No. 15/640,321, of Grassadonia, B., et al., filed Jun. 30, 2017.
Non-Final Office Action dated Jan. 28, 2019, for U.S. Appl. No. 14/453,526, of Jowdy, J.M., filed Aug. 6, 2014.
Final Office Action dated Mar. 22, 2019, for U.S. Appl. No. 15/941,797, of Bricca, G., et al. filed Mar. 30, 2018.
Notice of Allowance dated Apr. 1, 2019, for U.S. Appl. No. 14/098,336, of Wilson, M. et al., filed Dec. 5, 2013.
Notice of Allowance dated May 17, 2019, for U.S. Appl. No. 14/098,336, of Wilson, M., et al., filed Dec. 5, 2013.
Notice of Allowance dated Jun. 12, 2019, for U.S. Appl. No. 15/640,321, of Grassadonia, B., et al., filed Jun. 30, 2017.
Notice of Allowance dated Jun. 19, 2019, for U.S. Appl. No. 15/941,797, of Bricca, G., et al., filed Mar. 30, 2018.
Final Office Action dated Aug. 8, 2019, for U.S. Appl. No. 14/453,526, of Jowdy, J.M., filed Aug. 6, 2014.
Non-Final Office Action dated Aug. 12, 2019, for U.S. Appl. No. 15/476,604, of Grassadonia, B., et al., filed Mar. 31, 2017.
Non-Final Office Action dated Dec. 12, 2019, for U.S. Appl. No. 15/941,909, of Bricca, G., et al., filed Mar. 30, 2018.
Final Office Action dated Jan. 27, 2020, for U.S. Appl. No. 15/476,604, of Grassadonia, B., et al., filed Mar. 31, 2017.
Advisory Action dated Mar. 26, 2020, for U.S. Appl. No. 15/476,604, of Grassadonia, B., et al., filed Mar. 31, 2017.
Non-Final Office Action dated Apr. 1, 2020, for U.S. Appl. No. 14/453,526, of Jowdy, J.M., filed Aug. 6, 2014.
Final Office Action dated Jul. 10, 2020, for U.S. Appl. No. 15/941,909, of Bricca, G., et al., filed Mar. 30, 2018.
Final Office Action dated Sep. 4, 2020, for U.S. Appl. No. 14/453,526, of Jowdy, J., M., filed Aug. 6, 2014.
Non-Final Office Action dated Sep. 28, 2020, for U.S. Appl. No. 16/659,441, of Grassadonia, B., et al. filed Oct. 21, 2019.
Advisory Action dated Oct. 6, 2020, for U.S. Appl. No. 15/941,909, of Bricca, G., et al., filed Mar. 30, 2018.
Non-Final Office Action dated Oct. 16, 2020, for U.S. Appl. No. 15/476,604, of Grassadonia, B., et al. , filed Mar. 31, 2017.
Notice of Allowance dated Nov. 12, 2020, for U.S. Appl. No. 16/659,441, of Grassadonia, B., et al. filed Oct. 21, 2019.
Notice of Allowance dated Jan. 29, 2021, for U.S. Appl. No. 15/476,604, of Grassadonia, B., et al., filed Mar. 31, 2017.
Non-Final Office Action dated Feb. 22, 2021, for U.S. Appl. No. 16/529,583, of Wilson, M., et al., filed Aug. 1, 2019.
International Search Report and Written Opinion for International Application No. PCT/US2018/039756, dated Nov. 15, 2018.
Notice of Allowability dated Jul. 7, 2022, for U.S. Appl. No. 16/529,583, of Wilson, M., et al., filed Aug. 1, 2019.
Vijayan, A, et al., "Digital Payments: Blockchain based Security Concerns and Future", 2020 International Conference on Smart Electronics and Communication (ICOISEC), IEEE, Sep. 10-12, 2020, pp. 429-435.
Wang, G. et al., "Applying QR Code in Mobile Banking Use", 2021 International Conference on Information Management and Technology (ICIMTech), IEEE, Aug. 19-20, 2021, pp. 835-839.
Notice of Allowability dated Aug. 30, 2022, for U.S. Appl. No. 17/165,447, of Wilson, M., et al., filed Feb. 2, 2021.
Final Office Action dated Sep. 13, 2022, for U.S. Appl. No. 17/112,789, of Jowdy, J.M, filed Dec. 4, 2020.

\* cited by examiner

SECURE ACCOUNT CREATION

CROSS-REFERENCE TO RELATED APPLICATIONS

This application is a continuation under 35 U.S.C. § 120 of U.S. patent application Ser. No. 16/659,441, now U.S. Pat. No. 10,956,906, entitled "SECURE ACCOUNT CREATION," filed 21 Oct. 2019, which is a continuation under 35 U.S.C. § 120 of U.S. patent application Ser. No. 15/640,321, now U.S. Pat. No. 10,453,056 entitled "SECURE ACCOUNT CREATION," filed 30 Jun. 2017, which is a continuation under 35 U.S.C. § 120 of U.S. patent application Ser. No. 15/638,190, entitled "SECURE ACCOUNT CREATION," filed 29 Jun. 2017, which are incorporated herein by reference in their entirety.

BACKGROUND

Conventional banking and payment computing infrastructures often take a significant period to enroll new customers due to lengthy registration and approval processes. Conventional banking systems cannot activate new accounts quickly. They rely on processes known as "Know Your Customer" (KYC) or the "Customer Identification Program" (CIP) to provide increased assurance that the person applying for an account is who they say they are. This process can take days or weeks or require trips to financial institutions to create new accounts. These hurdles reduce the likelihood that potential customers will complete all necessary steps to actually become customers.

BRIEF DESCRIPTION OF THE DRAWINGS

The accompanying drawings constitute a part of this specification and illustrate embodiments together with the specification, explain the various aspects of the subject matter disclosed herein.

DETAILED DESCRIPTION

Figure 1:
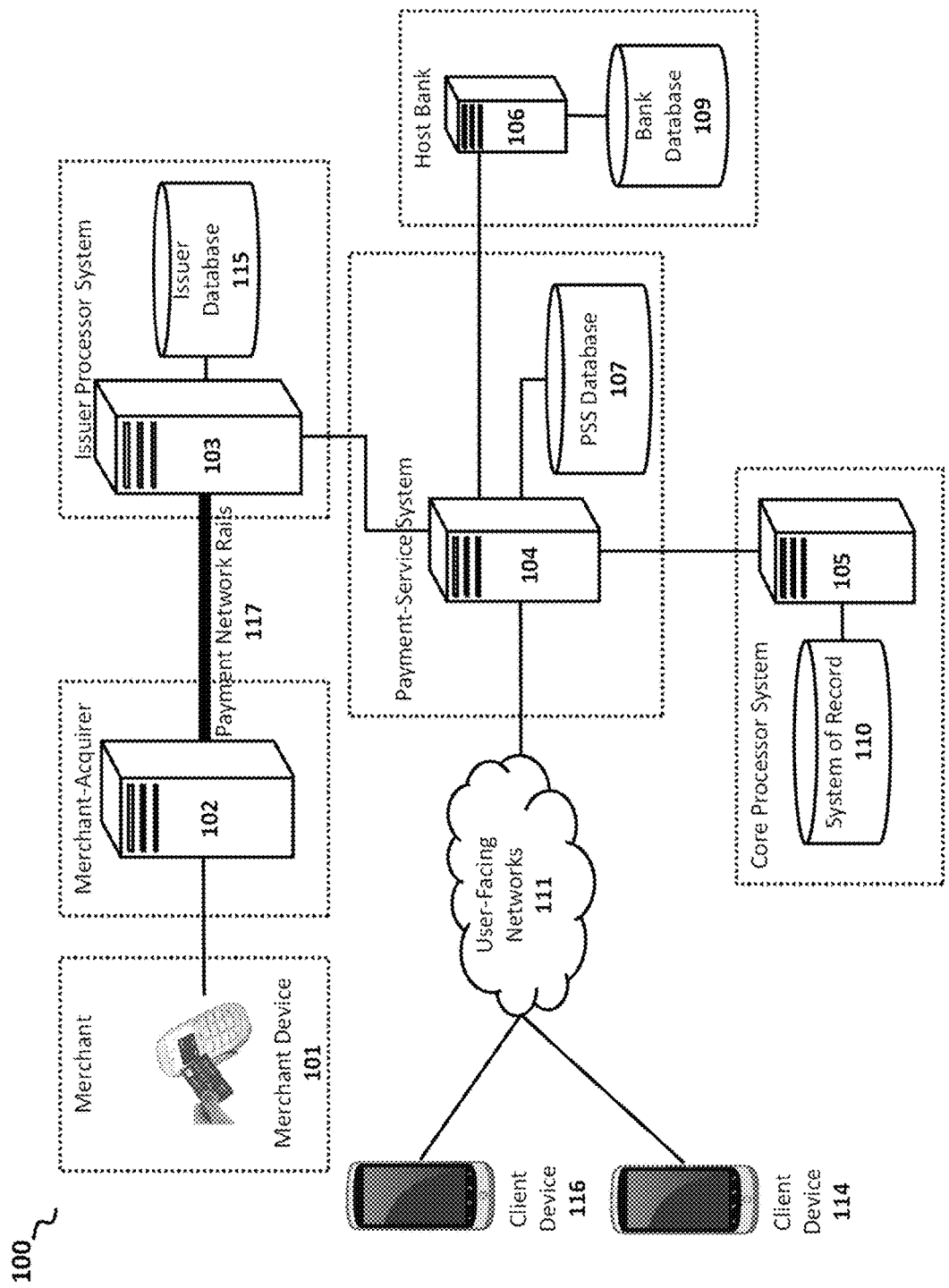
FIG. 1 illustrates an example embodiment of a system that includes several servers that handle various steps in a computerized system for tracking debit and credit transactions.

The systems and methods described in this disclosure include enhanced, secure ways to activate new accounts using previously obtained information. As previously described, KYC hurdles to accepting new customers cause potential customers to either lose interest or otherwise fail to complete all steps, such that they never complete the process of becoming a customer. The technological solution to this problem includes obtaining and storing information about potential customers using an unconventional combination of hardware and software to eliminate as many of these KYC hurdles as possible. The systems and methods can use metadata or previously obtained data to meet government requirements or desirable security features, rather than rely on more user inputs. Reducing the number of steps a user must take to open an account will result in more users completing the steps because there are fewer chances to fail to complete signup. Embodiments of this disclosure include issuing inactive payment card numbers to users in real-time and delaying activation of the payment card numbers. The payment card numbers can be activated prior to use, or can be activated during a payment transaction in real-time. In this way, a user can immediately receive and use a payment card number, and activate that payment card number during the payment process. The payment process can be interrupted to complete activation, and the user can either proceed with the payment process or restart the payment process after activation.

Disclosed herein are systems and methods for secure creation of new card numbers and account numbers for users of a payment-service system. A payment-service system ("payment-service system") may have servers and databases situated within a banking infrastructure to provide various features to users via a software application executed by a client device. The software application may interact with the payment-service-system servers, such that the payment-service-system servers and the software application offer the client device and the user certain features not ordinarily available in conventional banking infrastructures. These features may include the real-time provisioning of card numbers for a user's banking account. In operation, the client device may submit a request for a new card number to a payment-service-system server, which may be generated in real-time.

Conventional monolithic financial systems required consumers to wait several days to receive a new bank account, a new credit or debit card in the mail. This is due to the manual or semi-automated fashion in which new card numbers were generated and the resulting cards were distributed. In conventional systems, consumers would request a new card from an issuing entity, usually a consumer-facing bank, by mail or online. The issuing entity would then take several days to confirm whether to issue the card and would then send a physical card to the consumer. Once the consumer received the card, the consumer would have to activate the card, which is an additional step of the conventional process requiring the consumer to ask the issuing entity to activate and acknowledge the card number of the new card. In contrast, embodiments disclosed herein and variations thereof employ one or more servers of a consumer-facing computing system inserted and deployed within a non-conventional financial processing system, allowing the payment-service system to tap into the financial processing system in a new way, thereby facilitating a number of consumer-oriented feature sets. For instance, by having the servers of the consumer-facing system inserted into the financial services stream where others were not previously, new card numbers may be generated and sent directly to an application executing on a user computing device (e.g., smartphone, tablet). When the card numbers are generated, they may be useable before the consumer even receives the physical card or views the card number. Thus, the systems and methods disclosed herein may provision new card numbers for consumers in real-time, which may be useable by the consumer via their device, without needing to wait for a physical card to arrive in the mail.

By extension, new security measures may be necessary to protect consumers from fraud, as the new card numbers can be used by the time the consumer receives the card number.

To address this concern, the systems and methods disclosed herein may provide new server behaviors to protect consumers from fraud through improved, intelligent server behaviors, which were not previously possible because servers were not deployed into the financial services stream in this manner. For example, the disclosed system can allow for pre-creation of an inactivated account number. The system may not activate the account number until a user requests activation. That is, the system might not link the virtual card to bank account until activation of said account. This helps prevent fraudulent transactions (device compromised) and conserves server resources.

Example System Components

Payment Service System

FIG. 1 illustrates an embodiment of a system 100 that includes several servers that handle various steps in a computerized system for tracking debit and credit transactions. The example system 100 may comprise a plurality of entity systems associated and operated by various entities of the system 100, including a merchant, merchant-acquirer, issuer processor, payment-service system, host banking system working in collaboration with the payment-service system to provide user-oriented services, and core processor system. Each of the example entity systems may comprise electronic devices (e.g., merchant computing devices 101, server computers 102, 103, 104, 105, 106) that execute the various processes described herein and networking devices that facilitate intercommunications between the various entities. Embodiments may comprise additional or alternative entity systems, and some embodiment may omit or combine certain entity systems of the example system 100 shown in FIG. 1.

Merchant Computing Device

A merchant computing device 101 may be employed by a merchant to request payment authorization for a particular transaction. The merchant computing device 101 may be any device capable of capturing payment request data from various types of payment instruments, and then transmitting payment authorization requests containing the request data to various components of a system 100. Non-limiting examples of a merchant computing device 101 may include a point of sale (POS) terminal, a credit card payment processing terminal (e.g., a credit card scanner), and a cash register. Non-limiting examples of payment instruments may include magnetic stripe cards, EMV cards, and virtual cards that may be stored on a client device 114. As mentioned, the merchant computing device 101 may comprise or may be coupled to various types of instrument readers configured to capture transaction data from certain types of payment instruments. For instance, if the payment instrument is a virtual card (e.g., cryptographic token) stored on a client device 114, and the client device 114 is configured to transmit payment request data for the virtual card using near field communications (NFC), then the merchant computing device 101 may comprise or may be coupled to an NFC scanner configured to capture the transaction data related to the virtual card via the NFC signal received from the client device 114.

In operation, a merchant computing device 101 may capture payment transaction data, such as a card identifier (CID) or payment card number, and then transmit the payment transaction data to a merchant-acquirer server 102. The merchant computing device 101 may be configured to generate digital messages containing the payment authorization request and transaction data, which, in some embodiments may be generated according to particular protocols or specifications. For example, the merchant computing device 101 may generate a payment authorization request according to one or more ISO standards in which the payment authorization request contains certain fields of payment transaction data. Non-limiting examples of data fields that may be included the digital message may include a merchant identifier (merchant ID), a merchant category code (MCC), an amount for the transaction, a timestamp (e.g., data, time), and a card number. In some implementations, the merchant computing device 101 may transmit the digital message containing the card and/or other payment information to a merchant-acquirer server 102, although in some implementations the digital message may be transmitted to other devices, such as an issuer processor server 103 of an issuer processor system.

Merchant-Acquirer

Merchant-acquirers may be financial institutions that process credit or debit card payments on behalf of a merchant. A merchant-acquirer may be configured to receive payments from banks that issue payment cards within a payment network entity (also referred to as a payment network association entity); examples of payment network entities may include Visa®, MasterCard®, Discover®, and American Express®. A merchant-acquirer server 102 may be any computing device configured to communicate, over predetermined payment network rails 117, digital messages containing payment transaction data to and from one or more merchant computing devices 101, as well as transaction data to and from the issuer processor server 103. In operation, the merchant-acquirer server 102 may perform one or more processes on the digital message, and forward at least some of the payment transaction data collected by the merchant computing device 101 to the issuer processor server 103 over the payment network rails 117 of a particular payment network entity (e.g., Visa® or MasterCard® networks). In some implementations, the merchant-acquirer server 102 may forward to the merchant computing device 101 payment authorization response messages from the issuer processor server 103, indicating whether the payment was authorized, interrupted, or declined.

In operation, the merchant computing device 101 may capture payment card information and then generate and transmit a digital message, such as a payment authorization request, comprising the payment card information along with transaction data (e.g., transaction amount, merchant identifier) to a merchant-acquirer server 102. The merchant computing device 101 may be configured to generate digital messages containing the payment authorization request, which includes the payment card information and transaction data, may be generated according to particular protocols or specifications, e.g., one or more ISO standards in which the payment authorization request can contain certain fields for the payment card information and the transaction data. Non-limiting examples of data fields that may be included the digital message may include a merchant identifier (merchant ID), a merchant name, a merchant category code (MCC), an amount for the transaction, a timestamp (e.g., data, time), a token, and a card number. In some implementations, the merchant computing device 101 may transmit the digital message containing the card and/or other payment information to a merchant-acquirer server 102, although in some embodiments, the digital message may be transmitted to other devices, such as an issuer processor server 103 of an issuer processor system.

Payment Network Association and Payment Network Rails

Payment network entities (e.g., Visa®, MasterCard®, American Express®) may be entities that operate payment network rails 117, which may be a computing communications network configured to receive and transmit digital messages between and among merchant computing devices 101 and merchant-acquirer servers 102, as well as messages between merchant-acquirer servers 102 and issuer processor server 103. In operation, merchant computing devices 101 and merchant-acquirer servers 102 may generate, manipulate, and transmit digital messages containing payment transaction request messages and payment transaction data. The digital messages may be generated and manipulated according to the policies, standards, and protocols implemented by each particular payment network.

Issuer Processor

Issuer processor systems can establish payment card number records for customers, issue bills and statements, and process payments. The issuer processor server 103 can perform these functions and store transactions and payment card numbers in a storage device, such as an issuer database 115. Issuer processors will typically forward payment authorization requests to a core processor server 105. However, the example system comprises a payment-service-system server 104 positioned between issuer processor server 103 and core processor server 105. Furthermore, the payment-service-system server 104 can perform some or all of the functions typically associated with issuer processors, and therefore, in these embodiments, the merchant-acquirer server 102 can communicate over the payment network rails with the payment-service-system server 104. Although the issuer processor server 103 and the payment-service-system server 104 are shown as separate computing platforms, the issuer processor server 103 and the payment-service-system server 104 can be implemented as a single platform. The positioning of the payment-service-system server 104 between issuer processor server 103 and core processor server 105 allows the payment-service-system server 104 to provide added functionality to the system, such as intervene in, authorize, and record transactions in the payment stream (e.g., intercept payment authorizations, interrupt transactions, or decline transactions). As a result, the payment-service-system server 104 can also have access to all transactions associated with an account to provide further services to the client device 114 associated with the account.

In some embodiments, the issuer processor server 103 may be configured to generate a cryptogram token for a payment card number, according to various predetermined algorithms and requirements associated with a digital wallet application executed by a client device 114. The issuer processor server may transmit a new payment card number to the payment-service-system server 104. In some instances, the token was generated to represent the payment card number, based on predetermined tokenization algorithms. However, the client device 114 may execute one or more digital wallet applications allowing the client device 114 to securely store payment card numbers and tokens, and conduct payment transactions using the client device 114 instead of a physical payment card. The issuer processor server 103 may generate the cryptogram token for the payment card, using the payment card number and additional input parameters, and may transmit the cryptogram token directly or indirectly (through the payment-service-system server 104) to the client device 114 for storage and use in digital wallet-based transactions.

Host Bank

A host bank may be a third-party financial institution that works in collaboration with the payment-service system to provide various services to users through consumer-facing applications. The host bank system may have a bank server 106 and bank database 109. The bank server 106 may communicate with a payment-service-system server 104 via one or more networks, and may be any computing device comprising a processor configured to execute the various processes and tasks described herein. In operation, the bank server 106 may generate new bank accounts and may interact with the payment-service system, issuer processor system, and a core processor system to debit or credit the various bank accounts managed by the host bank system. The host bank may have a bank database 109 that may store banking data for various accounts, including routing numbers, account numbers, and account ledgers, among other types of information. The bank server 106 may generate and update records of the bank database 109 based on new and updated account information received from the various entities, according to account update requests and transaction data.

In some embodiments, the payment-service system may have one or more accounts with the host bank and user funds may be deposited into the account, where user-owned monies are tracked according to ledgers and user records or database account records in a payment-service-system database 107. In such embodiments, the bank server 106 may generate a routing number and account number for the payment-service system, and various forms of information about the payment-service system and transactions may be tracked in the bank database 109. Users who use the payment-service system services to facilitate payments or for other services may deposit funds into the account of the payment-service system held at the host bank. The payment-service-system server 104 may update a record of the user in the payment-service-system database 107 to reflect the amount of user money held in the payment-service system account at the host bank. The bank server 106 may update the amount of money in the payment-service system account reflected in the account data and ledgers stored in the bank database 109, based on various transaction request messages received from the payment-service-system server 104. The payment-service-system server 104 may similarly update the amount of money belonging to the user in the payment-service-system database 107, based on various transactions.

In some embodiments, the host bank may open and manage a financial account for each user registered in the payment-service-system database 107. In such embodiments, the bank server 106 may receive instructions from the payment-service-system server 104 to open a new account for a user, when the user registers with the payment-service system services, in response to some other trigger or instruction received from the payment-service-system server 104. The bank server 106 may execute one or more Know-Your-Customer (KYC) processes designed for collecting certain types of information about the user. In some cases, the bank server 106 or the payment-service-system server 104 may generate one or more graphical user interfaces (GUIs) configured to receive user information from the client device 114. And in some cases, the payment-service-system database 107 may contain the requisite KYC process data in a record of the user, which the payment-service-system server 104 may transmit to the bank server 106. The bank server 106 may generate one or more records for the user in bank databases 109, which may include generating a bank account number for the user. The bank server 106 may transmit the host bank account information for the user to the payment-service-system server 104, where the information may be stored into a record for the user in the payment-service-system database 107, identified by a user ID associated with the user.

Payment-Service System

A payment-service system ("payment-service system") may comprise payment-service-system server 104. A payment-service-system server 104 may comprise a memory and a processor, whereby the memory comprises a set of computer-readable instructions that are executed by the processor. Although the payment-service-system server 104 is shown as a single server, it should be appreciated the functionality of a payment-service-system server 104 may be performed by computing devices. In the example system 100, a payment-service-system server 104 may be coupled to issuer processor servers 103 and core processor servers 105, such that the payment-service-system server 104 may be situated between the issuer processor system and the core processor system. As mentioned previously, it should be appreciated that in some embodiments the payment-service-system server 104 may be configured to execute tasks and processes of an issuer processor server 103, such that the payment-service system may function as an issuer processor system. It should also be appreciated that in some embodiments the payment-service-system server 104 may additionally or alternatively be configured to perform various tasks and processes of a core processor server 105, such that the payment-service system may function as a core processor system.

Additionally, the payment-service system may have one or more payment-service-system databases 107 that store records of users, account and transaction ledgers, and other forms of information. A payment-service-system database 107 may be hosted on the machine-readable storage of one or more computing devices, such as servers, laptops, and desktops, among other types of computing devices. The payment-service-system databases 107 may comprise or may otherwise be coupled to a payment-service-system server 104 via one or more internal networks, within the operational boundaries of payment-service system network devices.

A payment-service-system database 107 may include a user account database that stores user profile records containing data fields for various types of data; non-limiting examples of information stored in records of the user account database may include user identifiers (user ID), user payment card numbers, transaction data, bank account data, and machine-readable tokens representing payment card numbers, among other types of information about users and user accounts. In operation, a payment-service-system server 104 may generate and update a user record according to registration or demographic data received from the client device 114 during a registration process, and according to transaction data received from the client device 114 or other entities of the system 100, such as the host bank, issuer processor, and core processor, among other entities, during other processes.

As an example of processes affecting a payment-service-system database 107 containing user information, in embodiments where the host bank holds accounts for each individual user, during a registration process the payment-service-system server 104 may receive a new account request and various types of user information and client device data from a client application published by the payment-service system and executed by the client device 114. The payment-service-system server 104 may forward the request to a bank server 106 that may generate a new financial account for the user in the bank database 109, which may include generating and returning to the payment-service-system server 104 the routing number of the host bank and a unique account number for the user's new financial account. The payment-service-system server 104 may store into the user record of the payment-service-system database 107, the data about the user, the data associated with the client application and/or the client device 114, and the data associated with new account held at the host bank. Alternatively, in embodiments where the host bank manages accounts for the payment-service system, during the registration process the payment-service-system server 104 may generate the user record in the payment-service-system database 107, and may update the user record to reflect amounts deposited or debited, into or out of the payment-service system account held at the host bank. The payment-service-system server 104 may also receive data from the client device 114 and store it into the user profile record of the payment-service-system database 107, along with already-known data about the user, such as data associated with the client application or the client device 114.

As another example of a process affecting a payment-service-system database 107 that contains user information, the payment-service-system server 104 may receive a new card request from the client application executed by the client device 114, thereby prompting the payment-service-system server 104 to execute various processes for generating a new account for the user. The payment-service-system server 104 may retrieve a payment card number and store the payment card number into a user record of the payment-service-system database 107. In some implementations, the payment-service-system server 104 may execute a tokenization algorithm to generate a token that represents the payment card number, such that the token may operate as an alias or encoded representation of the payment card number. In such implementations, the payment-service-system server 104 may store the token into the payment-service-system database 107 records for the user, and may then exchange the token with various devices of the system 100 during operational processes, allowing the devices to communicate transaction data using the token instead of transmitting the payment card number "openly" over the various computing networks. The payment-service-system server 104 may transmit the token and/or payment card number to the client device 114 for storage and later usage. In addition, the payment-service-system server 104 may transmit the payment card number to the issuer processor server 103, the bank server 106, and/or core processor server 105, or other computing device of entities that would require the payment card number generated for the user prior to any transactions being conducted using the payment card number.

A payment-service-system server 104 can communicate transaction data to a core processor server 105, which may record the payment authorization and other transaction data into a system of record database 110 and may further report the transaction data to the Federal Reserve and/or other entities that may be associated with the transaction. Although the core processor server 105 may transmit response messages indicating whether a transaction request associated with a user's payment card number should be authorized. The payment-service-system server 104 may make various determinations whether to confirm or otherwise authorize payments based on certain criteria, such as whether the transaction would cause an overdraft on the user account, whether the account is activated, the amount of the transaction, or the type of purchase (e.g., television v. lottery tickets). In some implementations, the payment-service-system server 104 may be configured to reject all transaction requests until a request to activate a payment card number has been received from an authorized client device 114 associated with the user. Conventional systems may take several days to activate a new payment card and payment card number. But unlike conventional payment systems, a payment-service-system server 104 may be situated between the host bank and issuer processor, and thus the payment card numbers are capable of being activated and used in real-time, the moment the card number is generated. As such, the payment-service-system server 104 transmits a useable card number to the client device 114, among other parties of the system 100. For the user's protection, because the payment card can be used when the payment card number is transmitted to the client device 114, the payment-service-system server 104 may reject all payment transactions requested by default. Likewise, the activation status of the payment card number in a user record in the payment-service-system database 107 may indicate that the card number has not been activated yet. The payment-service-system server 104 may prompt the user, via a client-side GUI presented on the client device 114, to activate the card. The activation request from the client device 114 may instruct the payment-service-system database 107 to update the activation status of the payment card number in the user profile or database account record to indicate the card has been activated, and thus the payment-service-system server 104 may authorize payment transactions satisfying any other criteria that might be verified by the payment-service-system server 104.

Devices of the payment-service system may include, or may otherwise be coupled to, one or more user-facing networks 111, such as communication channels including the internet, SMS, or 3G-5G, through which client devices 114 of users may access the payment-service-system server 104 and payment-service-system databases 107. The user-facing networks 111 may comprise hardware and software computing-communications components configured to support communications between the client devices 114 and the payment-service-system server 104, where at least some of the networks 111 include internet protocol (IP) based networking technologies that allow the client devices 114 to communicate with the payment-service-system server 104. Non-limiting examples of components of the user-facing networks 111 may include routers, switches, firewalls, and the like.

Core Processor and System of Record

A core processor may be a financial institution responsible for authorizing transactions, releasing funds, managing a system of record database 110, conducting various transactions and verifying identity. The core processor entity may be a bank or a third party that provides software services to the bank allowing the bank to function as the core processor. Some financial institutions may maintain core processor servers 105 internal to the financial institution network boundaries. It should be appreciated that in some implementations the various entities may function as a core processor entity. For instance, in some circumstances, the core processor and the host bank may be the same entity, and thus the computing devices may be the same devices.

A core processor server 105 receives and updates a system of record database 110 that can maintain accurate information of the account balances of an account. Transactions may be pending or in various stages of the payment stream, but the official recordation of those transactions is by the system of record database 110. Certain parties, such as the account owner, the merchant, the issuer processor, or the payment-service system, may assume certain risks that an account holder does not have sufficient funds to fund a transaction, until the core processer server 105 authorizes the transaction and records the transaction in the system of record database 110.

In operation, when a payment-service-system server 104 receives a payment authorization request from a merchant computing device 101 via the various entities and devices, the payment-service-system server 104 can forward the associated transaction information to core processor server 105, which maintains an account corresponding to the payment card used in the payment transaction. The system of record database 110 may manage the account information using the core processor server 105, along with a ledger of transactions for the account and other user profile information. In some cases, the core processor server 105 may transmit account information, such as an indication for an amount of funds available to cover a transaction amount, to the payment-service-system server 104. The payment-service-system server 104 may determine based on preconfigured criteria whether to authorize the transaction based upon the account information received from the core processor server 105. As previously mentioned, in some embodiments, the payment-service-system server 104 may be configured to deny all transactions associated with a payment card number associated with a user profile in the payment-service-system database 107 until an activation request is received from the user via an authorized client device 114 associated with the user. The payment-service-system server 104 may be configured to make additional or alternative determinations regarding authorizing payment transaction requests independent of the core processor server 105 determinations and indications. For instance, the payment-service-system server 104 may reject transaction requests associated with the payment card number of the user when the payment-service-system server 104 determines that the payment card number is inactive, or there would be an overdraft on the account, even though the bank hosting the account of the user would permit the overdraft.

The payment-service-system server 104 can communicate transactions to the core processor server 105, which may update the system of record database 110 with transaction information associated with user accounts registered with the payment-service system. The core processor server 105 may further report the transaction data and the daily ledger results in the system of record database 110 to the Federal Reserve and any other banks that maintain account records associated with the payment card used in payment authorizations and transactions. Depending on criteria, such as account activation status, the core processor server 105 may generate an authorization response that may be forwarded through the payment-service-system server 104 to various devices and entities of the system 100 (e.g., merchants, issuer processor, merchant-acquirer, merchant), to confirm how the merchant may complete the payment transaction, indicating whether the transaction request was authorized or rejected by any particular entity in the payment authorization stream of the system 100.

In the conventional payment stream, an issuer processor typically forwards payment authorization requests to a core processor server 105. However, according to embodiments described in the disclosure, such as the example system 100, and variations of such embodiments, a payment-service-system server 104 is situated between an issuer processor server 103 and a core processor server 105. Situating the payment-service-system server 104 between issuer processor server 103 and core processor server 105 allows for the payment-service-system server 104 to intervene in, authorize, and record transactions in the payment stream, such as payment authorizations. Consequently, the payment-service-system server 104 can have visibility into data generated for all transactions associated with a user's account and payment card number to provide additional services to the user using the account. As such, the payment-service-system server 104 may execute additional features and transaction processes that were not available in the conventional payment and financial systems. Furthermore, the payment-service-system server 104 can perform some or all of the functions typically associated with issuer processors, and therefore, in some embodiments, the merchant-acquirer can communicate directly with the payment-service-system server 104. In other words, some embodiments may facilitate collapsing the number of entities required to be involved in conventional payment transaction processing streams.

Client Device

Client devices 114 and 116 may be any computing devices capable of executing a locally-installed application or accessing a web-based application executed by a payment-service-system server 104. Non-limiting examples of client devices may include a mobile phone, tablet, smart watch, personal data assistant, gaming console, and personal computer, among other computing devices. The client devices 114 and 116 may transmit various forms of device data with user data, during the registration, authorization, and verification processes. For example, during a registration process, the user may input into a registration GUI presented on the client device 114, demographic information associated with the user (e.g., name, date of birth, addresses, social security number). In addition, the client application may query a MAC address of the client device 114 and an IP address of the client device 114, as well as other types of information about the client device 114. The device data may be submitted with the user data during the registration process, and may be stored in the user record in the payment-service-system database 107. As another example, a tokenization algorithm designed to mask the actual payment card number generated by the payment-service-system server 104 may use data inputs, such as the user ID of the user and/or a device identifier (device ID) associated with the client device 114; the device ID may be generated by the payment-service-system server 104 according to various input values, or the device ID may be an existing data field, such as the MAC address of the client device 114. As mentioned, the client device 114 may access and communicate with the payment-service-system server 104 over one or more user-facing networks 111 (e.g., the internet).

Figure 2:
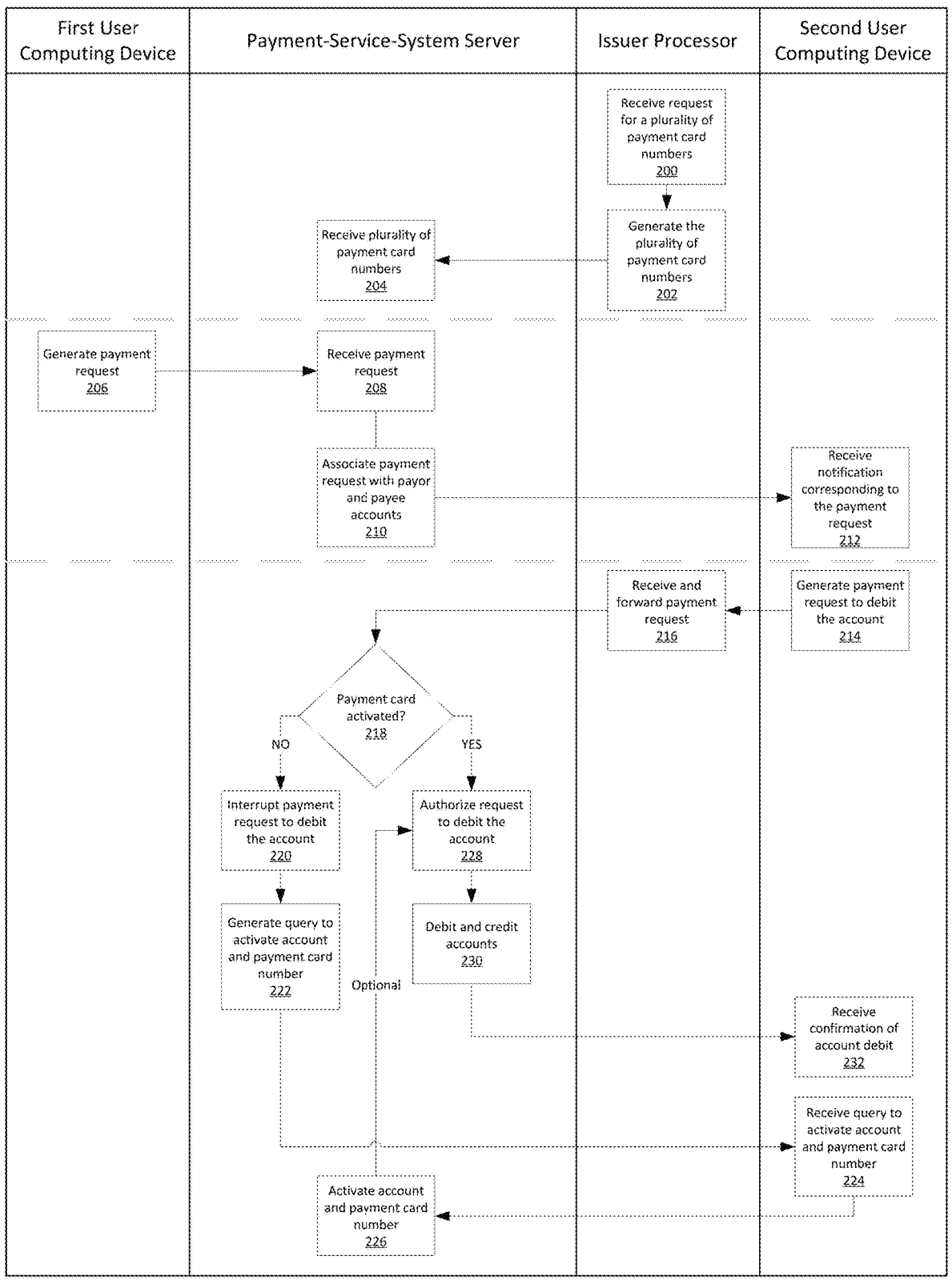
FIG. 2 illustrates an example method of securely assigning an account and payment card number.

Client devices 114 and 116 can communicate with one another to effect peer-to-peer (P2P) payment transactions between users. The client devices 114 and 116 can communicate with payment-service-system server 104 using payment requests, authentication requests, acceptance of payment requests, and confirmation of payments. FIG. 2, described below, further elaborates on an example of how the two client devices can communicate to effect peer-to-peer payment requests and new account creation.

Generating Payment Card Numbers

FIG. 2 illustrates a cross-functional flowchart of a process for securely establishing a payment account in a system including a first user computing device, a payment-service-system server, an issuer processor, and a second user computing device, wherein the first and second user computing devices correspond to two users, and steps 206-212 correspond to a P2P funds transfer between the two users. This process includes three parts. First, steps 200-204 illustrate a backend processes for acquiring account information in anticipation of generating new accounts in the future. These first steps solve a technical problem of securely establishing accounts in real-time. Second, steps 206-212 illustrate a process for establishing a new account. These second steps solve a technical problem of creating a user payment account in real-time, in which the server generates a unique card number and transmits securely and instantly to an application executing on a user device such that the user may use the card number in a current or future payment transaction. Third, steps 214-226 illustrate a process for making a payment and activating the payment card number. These third steps solve a technical problem of activating a payment card on a user computing device in real-time, without the need to go through a lengthy and difficult process of payment card activation.

For the first process, step 200 illustrates receiving a request for a plurality of payment card numbers at an issuer processor. This step can include an automated request from the payment-service system to the issuer processor to receive a first batch of payment card numbers or a replenishment of numbers that the payment-service-system server has already used. The automated request can be transmitted by the payment-service-system server as an initial step to obtain an initial batch of payment card numbers. The automated request can also be transmitted after the number of payment card numbers falls below a predetermined threshold, e.g., 1,000 payment card numbers.

In step 202, the issuer processor (or in the alternative the payment-service system) can generate a payment card number or a token representing the payment card number (or batch of numbers or tokens). The issuer processor may generate the payment card number by appending together several sets of digits, including a predetermined bank identification number (BIN) prefix, a set of randomly generated digits representing a number generated according to a random number generator algorithm, and one or more checksum digits generated and applied according to a checksum algorithm that confirms the uniqueness and accuracy of the new payment card number as a whole. Generally, the BIN prefix is a set of digits, typically six digits, associated with a bank or card issuer. The issuer processor or other entity may provide the BIN prefix to the payment-service-system server; the payment-service-system server may store the BIN prefix digits and may be configured to apply the BIN prefix digits to new payment cards generated by the payment-service-system server, in accordance with the issuer processor or other entity. The payment-service-system server or the issuer processor may also generate a set of digits for the random number portion of the card number using a random number generator algorithm and generate a set of one or more digits based on a Luhn check algorithm (or other checksum algorithm) dictated by the issuer processor or other entity. The payment-service-system server or the issuer processor may append the set of one or more Luhn check digits to the randomly generated set of digits. The payment-service-system server or the issuer processor may then use the Luhn check digits to determine whether the randomly generated number is unique. The Luhn check digits and randomly generated digits may be appended to the BIN prefix together, at the same time, or individually, such that the Luhn check algorithm may determine the uniqueness of the randomly generated value with or without the BIN prefix value. In the example embodiment, the payment-service-system server or the issuer processor may use the Luhn check digits and the Luhn check algorithm to confirm that the payment card number, comprising the digits of the randomly generated number appended to the BIN prefix digits, is a unique payment card number that does not match a second payment card number. In the event the payment-service-system server or the issuer processor determines that the Luhn check fails, and thus there is a collision with a second payment card number (e.g., an existing or already-used payment card number), then the payment-service-system server or the issuer processor may continue generating sets of digits for a random number until the payment-service-system server or the issuer processor identifies a payment card number that satisfies the Luhn check algorithm, and does not match another payment card number. In some implementations, the payment-service-system server or the issuer processor may calculate a token for the payment card number, where the payment card number may be generated and stored in a high-security module of the same or different payment-service-system server or issuer processor, and the token may be exchanged with external entities and stored in databases and devices, such as the client device and the databases of third-party entities. The issuer processor may be configured to generate the token using an algorithm that uses a random number generator and one or more predetermined input values (e.g., user ID values, MAC address of client device). In some implementations, the tokenization algorithm may evolve or change over time, so as to require additional or alternative parameter inputs. The payment-service-system server or the issuer processor may execute a random number generator to generate cryptographically secure random numbers according to the algorithm. When a computer generates cryptographically secure random numbers, it is distinguishable from what may ordinarily be considered as identifying a number randomly. Patterns may emerge over time when computers are instructed to select a number at random, and thus special functions can be constructed to handle very large numeric values or alphanumeric strings for the random numbers to be truly random, to avoid collisions, and to prevent attackers from reverse engineering a pattern.

In step 204, the payment-service-system server can receive the payment card numbers or tokens and store them in a payment-service-system database for later retrieval. In this way, the payment-service system can be ready to establish accounts in real-time, without the need to contact additional severs to complete an account creation process. This can allow for users to have a simplified, seamless experience in generating a new account, which will make them more likely to use the account. This can increase usage of the payment-service system by making transaction easier for payors, merchants, and other payees. Following storage of the payment card numbers of tokens, the payment-service system can wait for a payment request, which is discussed in the following steps 206-212.

In the second process, the first user computing device can generate a payment request destined for the second user computing device in step 206. The payment request can comprise an amount, e.g., $150, a payor identifier, e.g., username or phone number, and a payee/recipient identifier, e.g., username or phone number. After generating the payment request, the first user computing device can transmit the payment request to the payment-service system, which receives it in step 208. Receipt of a payment request by the payment-service-system server can trigger a process to associate the payment request with a payment card number or an account of the payor and with a payment card number or an account of the payee, as illustrated in step 210. As part of step 210, the payor may have a pre-established account with the payment-service system. If the payee also has a payment account associated with the payment-service system, then the payment can be automatically completed. However, if the payee does not have a pre-established account, the payment-service system can create an account for the recipient using already-known information about the payee, including a payment card number, a payment token, an account number, ID, and any other additional information about the user. Such additional information can include information about the payment transaction, such as the reasons for the payment, biographical information received as part of the payment transaction, such as name, address, etc. The payment-service-system server can also generate instructions for the recipient/payee to retrieve the funds sent to them. The instructions can include, for example, a message as to the amount, the sender/payor's ID, and a link to a website for activating the account or retrieving the funds.

The payment-service system can send the instructions to the recipient, who receives them in step 212. In addition to sending the instructions, the payment-service-system server may transmit the token representing the payment card number to the client device, an issuer processor, and/or a card printer service. The client device may store the token in a non-transitory machine-readable memory of the client device. The client application may access the token and display the payment card number via one or more GUIs, and the client application may access the token to transmit the token or payment card number to a merchant computing device or to another a client device to conduct a payment transaction through a digital environment, without requiring the physical payment card. In some implementations, the client device may also receive from an issuer processor server, a cryptogram token representing the payment card in a third-party digital wallet application. In embodiments where the payment-service system server provides functions as the issuer processor, the payment-service-system server may generate the cryptogram token for the digital wallet application and transmit the cryptogram token to the client device.

In some embodiments, where the payment-service system service provider is a distinct entity from the issuer processor, the payment-service-system server may transmit the payment card number to the issuer processor server. The issuer processor server may update an issuer processor database to reflect the newly issued payment card number, which may allow the issuer processor server to execute any number of authorization, verification, and/or authentication processes that protect the user and may ease the processing burden of payment-service-system server, when payment transaction request messages are received from merchants, merchant-acquirers, and/or other client devices. The issuer processor may additionally update the databases of the payment network entity (e.g., Visa®, MasterCard®, American Express®) to indicate that the payment card number has been issued to a user.

The payment-service-system server may transmit the payment card number to a server of a card-printing entity that is authorized by the issuer processor and/or payment network entity to print and ship physical payment cards to users. The payment card may be shipped to the user, who may then employ the payment card with the payment card number in payment transactions like any ordinary payment card. In some implementations, the payment-service-system server may transmit graphical data to the card-printing entity, generated by the user through one or more design GUIs executed on the client application of the client device. Accordingly, the payment card may be customized according to the real-time payment card number generated in response to the user's request, and according to the aesthetic graphics generated by the user interacting with the design GUIs.

In the third process, now that the payee/recipient has funds and a payment card number or an account number, the second user computing device can generate a payment request to debit the account, as illustrated by step 214. Generating the payment request can include using the payment card number or payment token to make a purchase, either using an application or by entering the payment card number in a website or otherwise giving the payment card number to a merchant. The payment card number and token can be associated with the issuer processor, which may first receive the payment request in step 216. Alternatively, the payment-service-system server can act as the issuer processor and perform step 216 itself, without involving the issuer processor. The issuer processor can look up the payment card number or token, and associate it with and forward it to the payment-service system.

In a next step 218, when the payment-service-system server receives a payment transaction request and associated transaction data. The payment transaction request can be from a payee (e.g., merchant) or the payor. The payment-service-system server can begin to rout the request to a system or record server, and may determine whether to permit the payment transaction based on any number of factors, including the activation status field in a database record associated with the payment card number. Because payment card numbers generated by the payment-service-system server are technically active card numbers as far as other entities external to the payment-service system are concerned, it is possible that a new payment card number would be honored by various entities before the user possesses the new payment card number, or before the user wants the new payment card number to be useable. For instance, a payment transaction request containing transaction data identifying the new payment card number may be received and processed by a core processor or system of record server. The core processor or system of record server may honor the payment card number and determine that the payment card number should be honored by an issuer processor, merchant-acquirer, and/or a merchant. For security purposes, the payment-service-system server may make a determination whether to honor the payment transaction request independently from the core processor or other external entities. Here, the payment-service-system server may independently determine whether to accept or reject the payment transaction request based upon the activation status field associated with the new payment card number.

If the payment card number is not activated, the payment-service system can interrupt the routing to the system or record server or decline the transaction to debit the account, as illustrated in step 220. Interrupting the routing can include initially declining the transaction (pending account activation) and ceasing a process to transmit the payment request to the system of record server. Declining the transaction can include generating a decline message to send to the second user computing device. In addition to the decline message, the payment-service system can generate a query to activate the account and the payment card number (step 222). This query can include instructions for activating the account or payment card number. The instruction can include a link to a webpage with further instructions, or cause an application to be downloaded or otherwise run locally on the user computing device to begin an activation process. The second user computing device can receive the query to activate the account in step 224, and display the query to the user. In response to the query, the user can perform a series of steps to activate the account via communication with the payment-service system in step 226. This can include activating a background process with the payment-service system to use two-factor authentication to activate the account. For example, in addition to requesting activation via an application or webpage, the payment-service system can send an email or SMS message containing a unique code (e.g., random number) to the second user computing device to verify that the true owner is requesting that the account be activated. The payment-service-system server can compare the unique code transmitted to the user (via email or SMS) to the code the user entered, if they match, the payment-service-system can continue with the activation process. During the activation process, the second user can also input KYC or personal information, such as address, full name, social security number, and date of birth. In some circumstances, the payment-service-system server may update an activation status data field in the record of the user, or some other database record, in a payment-service-system database. As previously mentioned, due to the real-time generation of a useable payment card number, the payment card number may be employed by the user as soon as the user receives the payment card number from the payment-service-system server. As such, regardless of whether other entities, such as a core processor, would authorize a transaction associated with the payment card number, the payment-service-system server may be configured to reject all transactions associated with the payment card number until the payment-service-system database indicates that the card is activated. In this way, should a third-party intercept the physical payment card en route from the card-printing entity to the user, the payment-service-system server will prohibit the third-party from fraudulently conducting any transactions using the payment card. After transmitting the payment card number to the client device, the client application may display the payment card number to the user, and may display on a graphical user interface (GUI) prompting the user to activate the payment card number.

In some implementations, users may be allowed to selectively update the activation status of a payment card number by submitting subsequent activation requests through the appropriate GUI present on the client application. This feature allows the user to continually and selectively "turn on" and "turn off" a payment card number listed in the database record of the user. Each subsequent request indicates to the payment-service-system server whether to update the status field to indicate that the payment card number is activate or inactive, and thus indicates to the payment-service-system server whether to authorize payment transaction requests associated with the payment card number.

In circumstances where the payment-service-system server receives an initial or subsequent activation request from the client application of the client device, then the payment-service-system server may update the activation status field in the user record of the payment-service-system database for the corresponding payment card number. Based on the activation request, the activation status field in the record of the user and/or record for the payment card number may indicate that the user has received or otherwise accepted the payment card number and the responsibilities for tracking the payments. In addition, the user has also indicated that the payment-service-system server should permit payment transaction requests linked to the payment card number, where the payment-service system would otherwise reject payment transaction requested associated with the payment card number by default. As previously mentioned, the payment-service-system server may receive subsequent requests to deactivate the payment card number that instruct the payment-service-system server to update the activation status field to indicate that the user wants to "turn off" or deactivate the payment card number, and thus instructs the payment-service-system server to deny payment transaction requests when the payment-service-system server queries the activation status field.

After performing the steps to activate the account, the user can then try the interrupted transaction again, and proceed through steps 214-218, as just described. Alternatively, some embodiments can optionally automatically resume the interrupted payment request by transitioning to step 228 to complete the payment normally with an activated payment card.

After the account or payment card number is activated, the process for handing a payment request can proceed to step 228 to authorize the request to debit the account. This can include generating an authorization message to send to a merchant-acquirer computing device or to a user computing device.

After authorizing the request, the payment-service system can debit the payor's account and credit the payee's account by, for example, using an ACH transaction in step 230. After completing the debiting and crediting, the process can proceed to step 232 to notify the user computing device that the transaction was completed. Alternative embodiments can also include notifying the merchant-acquirer computing device that the transaction was authorized and completed.

As an alternative to the activation steps illustrated in FIG. 2, a user can preemptively activate their account by visiting a webpage or application to activate a payment card before attempting to make a payment. Using this alternative method avoids interrupting a payment transaction to activate a card.

Figure 3:
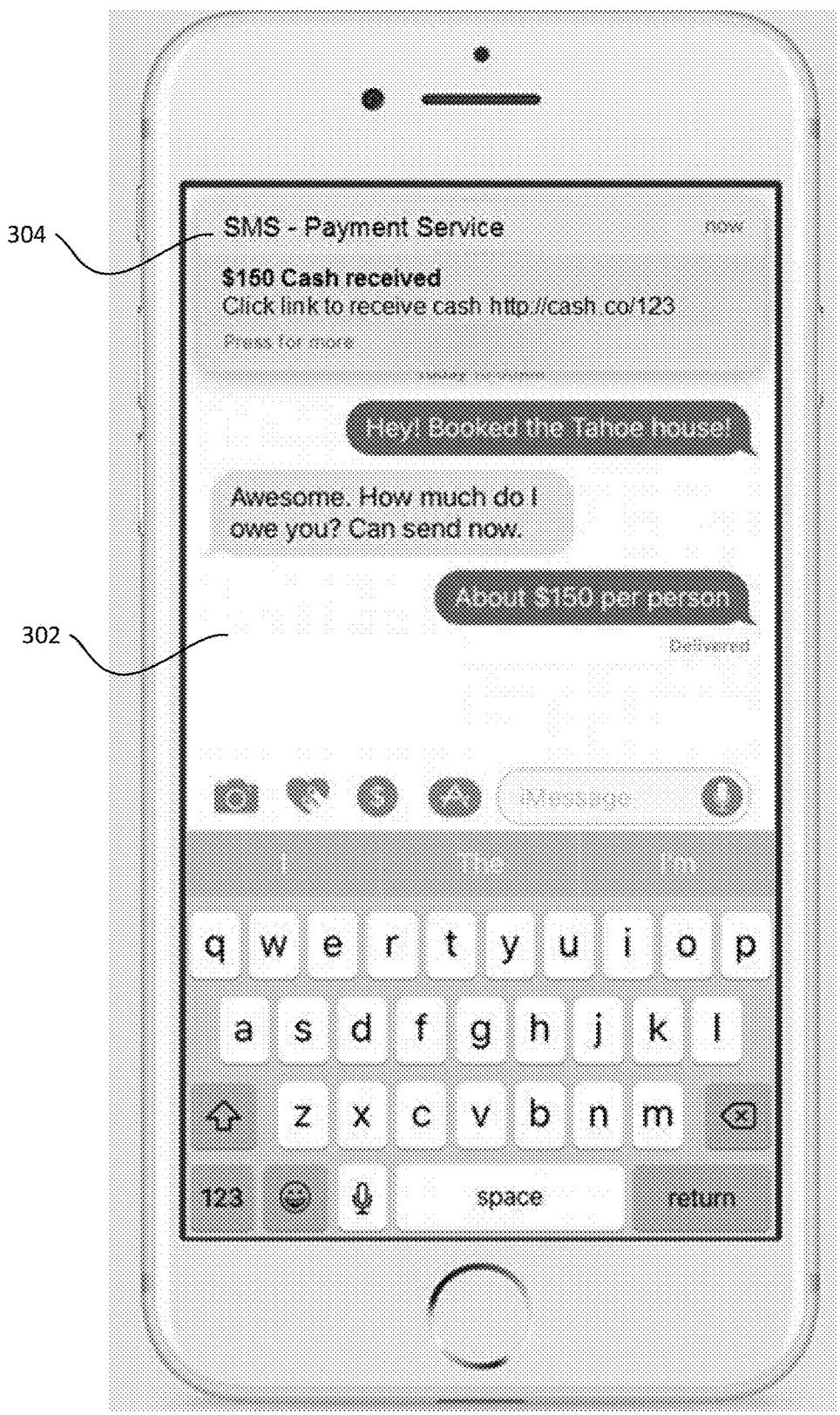
FIG. 3 illustrates an example graphical user interface for receiving a payment notification, according to an example embodiment.

FIG. 3 illustrates an example of step 212, in which the second user computing device receives a notification corresponding to a payment request from the first user computing device.

FIG. 3 illustrates a user computing device 300 receiving a notification in notification window 304, indicating, "$150 Cash received" in a payment transaction. The notification 304 further includes instruction for retrieving the funds: "Click link to receive cash http://cash.co/123." FIG. 3 further illustrates an example messaging application 302 that provides additional context for the payment. In the foreground of this example, the user is messaging another person about owing them $150. In response, the other person can send the user the $150 via a payment application of the payment-service system.

Embodiments need not be associated with such a conversation, but provides on example of why a person would send money electronically. Alternative notifications could be similar to the notification 304, but come from a payment application that is running in the background on the user computing device. That is, the application running in the foreground on the user computing device need not affect the notification 304, which notifies the user of a receipt of funds.

Clicking the link in notification 304 can result in the user proceeding through an activation process (for example as described in FIG. 2, steps 224 and 226), or at least notifying the user of their new account, balance, and payment card number, and instruction for using these features. Alternatively, the notification can contain information including the user's new payment card number or instructions for activating the payment card number, or a link to this information.

Embodiments of the notification can be different if the user is already registered. For example, the notification might simply notify the user that they have received the cash in their account and not provide instructions for using the cash, because the user already has an account and need not perform any additional steps to use the balance. The user will already have a payment card number and an account, and can therefore use the funds as they have in the past.

Figure 4:
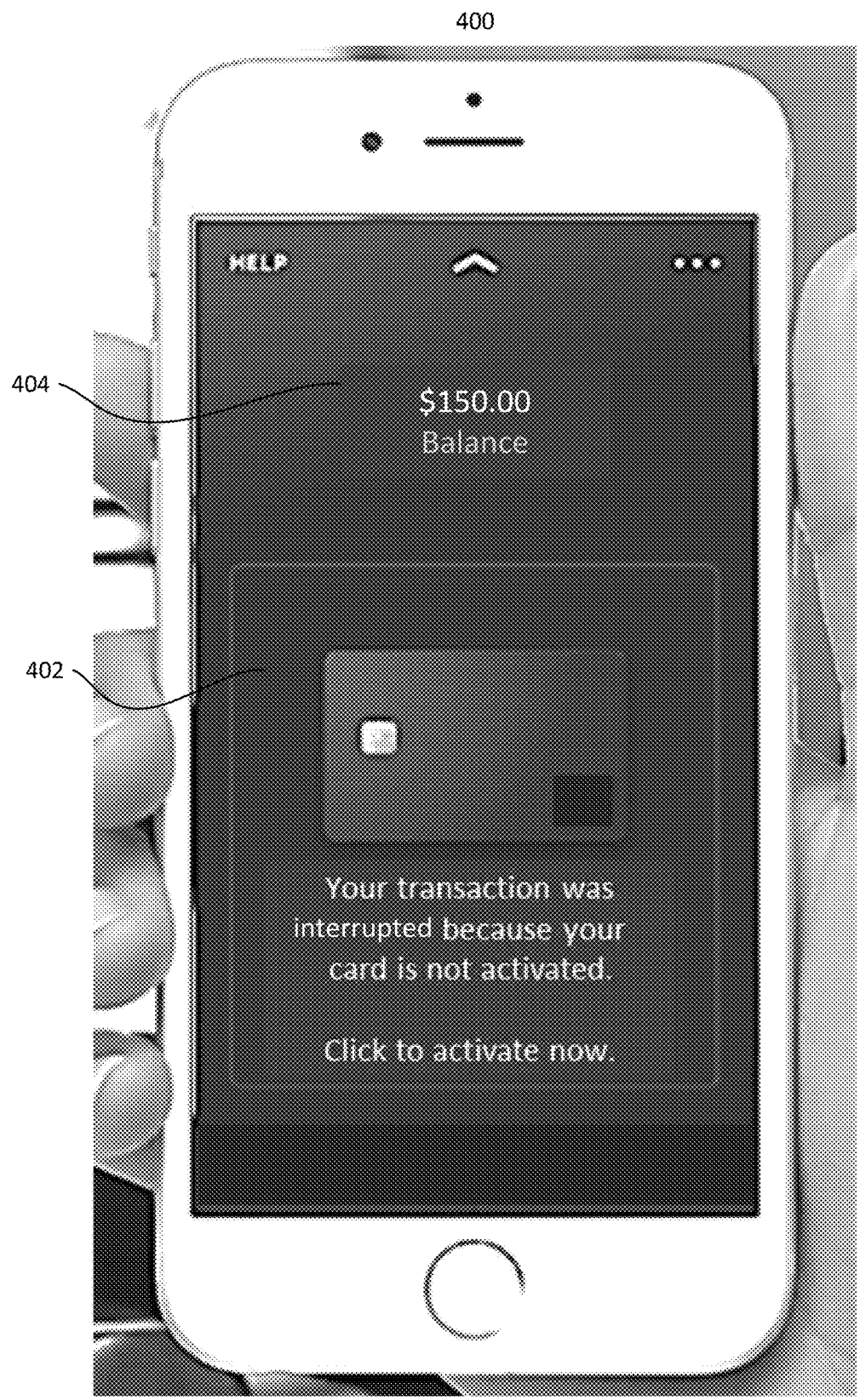
FIG. 4 illustrates an example graphical user interface of a notification of an interrupted transaction, according to an example embodiment.

FIG. 4 illustrates an example user computing device 400 displaying an interface providing a notification 402 indicating a transaction has been interrupted or declined. The notification 402 can appear in response to the user attempting to use a payment card number or account number that is not fully activated, e.g., the user has not performed all the activation steps. The user can use the payment card number or account number at, for example, an NFC reader, a magnetic strip reader, or on the internet via a first communication channel. The notification 402, in this example, states, "Your transaction was interrupted because your card is not activated. Click to activate now." Clicking the notification to activate the payment card number or account can proceed, for example, as explained in FIG. 2, steps 224 and 226. Clicking the link can also prompt the user to download a payment application associated with the payment-service-system, which can give the user access to additional payment features, including the ability to make purchases, view transaction history, make peer-to-peer payments, and activate the payment card.

Figure 5:
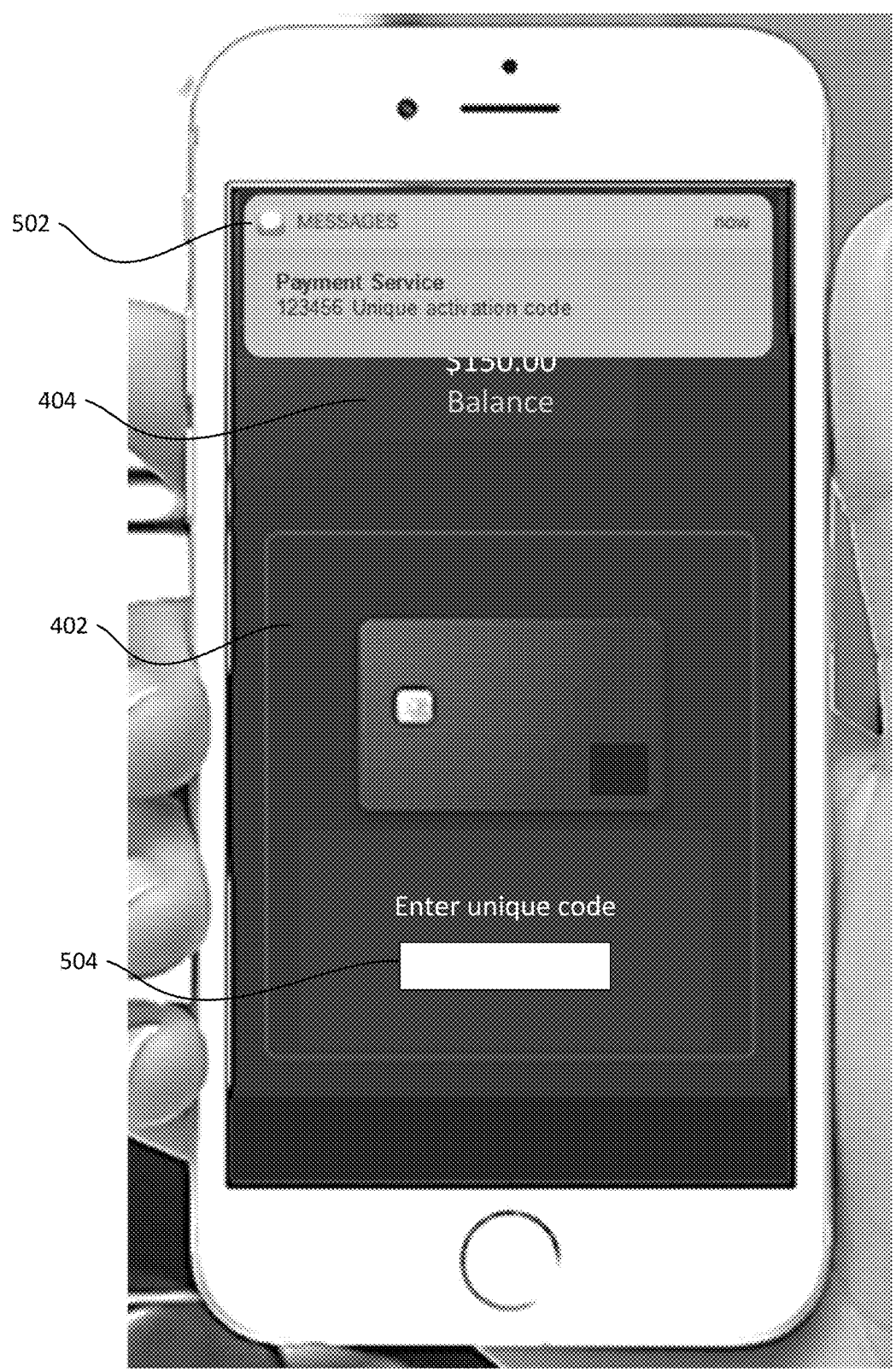
FIG. 5 illustrates an example graphical user interface for activating a payment card after a transaction is interrupted according to an example embodiment.

FIG. 5 illustrates the user receiving a second notification via a second communication channel. In this example, the second communication channel is an SMS message 502, stating "Payment Service/n 123456 unique activation code." Alternative second communication channels include email, phone calls, an instant message, or other notification. The user can receive a unique code, in this case 123456, to input into field 504, labeled, "Enter unique code." If the user enters the unique code, as illustrated in step 224 of FIG. 2, the process can continue to step 226 to activate the account, and the interrupted payment transaction can continue or the user can retry the payment transaction.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or referenced herein will sometimes be described in singular form for clarity. However, particular embodiments include multiple iterations of a technique or multiple instantiations of a mechanism unless noted otherwise.

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on a non-transitory computer storage medium for execution by, or to control the operation of, data processing apparatus. Alternatively or in addition, the program instructions can be encoded on an artificially-generated propagated signal (e.g., a machine-generated electrical, optical, or electromagnetic signal) that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Presently preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Example variations can be performing certain steps in different orders, omitting, or adding steps. For example, FIG. 2 illustrates three separate processes to obtain payment card numbers, establish a new account, and using/activating the new account. Embodiments can include performing each of these processes together. For example, a first user could transfer funds to a second user, where the second user does not have an account on the payment-service-system. This transfer could result in generating a new payment card number, prompting the second user to activate the payment card number, and activating the payment card number in real time. While there are a large number of variations, the claims specifically recite the claimed embodiments.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A computer-implemented method of assigning payment card numbers for individual user accounts associated with a payment service system, the method comprising:
   receiving, by the payment service system via an application executing on a computing device, a request to assign a payment card number to a user account associated with a user of the payment service system, wherein the request is in a context of an authorization for a payment transaction;
   retrieving, by the payment service system and from a database associated with the payment service system, an account record associated with the user account;
   determining, by the payment service system and based on the account record, that the user account is not associated with an active payment card number;
   identifying, by the payment service system, an unassigned payment card number;
   modifying, by the payment service system and in the database, the account record to assign the unassigned payment card number to the user account associated with the user as an active payment card number; and
   authorizing, by the payment service system, the payment transaction using the active payment card number, wherein the authorization causes a modification to an account balance of the user account.

2. The computer-implemented method of claim 1, further comprising:
   identifying the unassigned payment card number from one or more unassigned payment card numbers received from an issuer processor server.

3. The computer-implemented method of claim 2, wherein the one or more unassigned payment card numbers are stored in the database.

4. The computer-implemented method of claim 1, further comprising:
   transmitting, by the payment service system, the active payment card number to an issuer processor server to update an issuer processor database to reflect the active payment card number being activated.

5. The computer-implemented method of claim 1, wherein determining that the user account is not associated with the active payment card number comprises:
   retrieving, by the payment service system and from the account record, a second payment card number associated with the user account; and
   determining, by the payment service system, that the second payment card number is not active.

6. The computer-implemented method of claim 1, further comprising:
   transmitting, by the payment service system and to the computing device, a first code;
   causing, by the payment service system, the application executing on the computing device to display a notification window requesting the user to activate the payment card number by entering the first code in the notification window; and
   receiving, by the payment service system, and from the computing device, an activation request comprising a second code and personal information required for activation, wherein the payment service system modifies the account record to assign the unassigned payment card number to the user account associated with the user as the active payment card number after determining that the second code corresponds to the first code.

7. The computer-implemented method of claim 1, wherein modifying the account record to assign the unassigned payment card number to the user account associated with the user as the active payment card number comprises:
   executing, by the payment service system, a tokenization algorithm to generate a token from the unassigned payment card number that represents the unassigned payment card number; and storing, by the payment service system and in the database, the generated token in association with the account record.

8. The computer-implemented method of claim 7, further comprising:
transmitting, by the payment service system, the generated token to the computing device, wherein the computing device stores the generated token in a digital wallet application executing on the computing device.

9. The computer-implemented method of claim 1, further comprising:
transmitting, by the payment service system, the active payment card number to a server of a card-printing entity that subsequently prints a physical payment card corresponding to the active payment card number.

10. The computer-implemented method of claim 1, further comprising:
receiving, by the payment service system, a request from the user to deactivate or reactivate the active payment card number, the request comprising identification information to identify the user account;
retrieving, by the payment service system and from the database associated with the payment service system, the account record associated with the user account based on the identification information; and
modifying, by the payment service system and in the database, an activation status field, associated with the active payment card number, of the account record based on the request.

11. The computer-implemented method of claim 1, wherein the request to assign the payment card number to the user account is received contemporaneously with a request to modify the account balance associated with the user account.

12. The computer-implemented method of claim 1, further comprising:
receiving a request for the authorization for the payment transaction;
upon determining that the user account is not associated with the active payment card number, interrupting, by the payment service system, the request for the authorization for the payment transaction; and
subsequent to modifying the account record to assign the unassigned payment card number to the user account, resuming, by the payment service system, the request for the authorization for the payment transaction.

13. The computer-implemented method of claim 1, wherein:
receiving the request to assign the payment card number to the user account associated with the user of the payment service system comprises receiving, by the payment service system, an identifier for the user account;
retrieving the account record associated with the user account comprises identifying or creating the account record associated with the user account based on the identifier for the user account; and
determining that the user account is not associated with the active payment card number comprises determining, by the payment service system, that the account record associated with the user account is not associated with any payment card.

14. A payment service system comprising: one or more processors; and one or more computer-readable non-transitory storage media in communication with the one or more processors and comprising instructions that, when executed by the one or more processors, are configured to cause the payment service system to perform operations comprising:
receiving, via an application executing on a computing device, a request to assign a payment card number to a user account associated with a user of the payment service system, wherein the request is in the context of an authorization for a payment transaction;
retrieving, from a database associated with the payment service system, an account record associated with the user account;
determining, based on the account record, that the user account is not associated with an active payment card number;
identifying an unassigned payment card number;
modifying, in the database, the account record to assign the unassigned payment card number to the user account associated with the user as an active payment card number; and
authorizing the payment transaction using the active payment card number, wherein the authorization causes a modification to an account balance of the user account.

15. The payment service system of claim 14, wherein the instructions are further configured to cause the payment service system to perform operations further comprising:
identifying the unassigned payment card number from one or more unassigned payment card numbers received from an issuer processor server.

16. The payment service system of claim 15, wherein the one or more unassigned payment card numbers are stored in the database.

17. The payment service system of claim 14, wherein the instructions are further configured to cause the payment service system to perform operations further comprising:
transmitting the payment service system, the active payment card number to an issuer processor server to update an issuer processor database to reflect the active payment card number being activated.

18. One or more computer-readable non-transitory storage media including instructions that, when executed by one or more processors, are configured to cause the one or more processors of a payment service system to perform operations comprising:
receiving, via an application executing on a computing device, a request to assign a payment card number to a user account associated with a user of the payment service system, wherein the request is in the context of an authorization for a payment transaction;
retrieving, from a database associated with the payment service system, an account record associated with the user account;
determining, based on the account record, that the user account is not associated with an active payment card number;
identifying an unassigned payment card number;
modifying, in the database, the account record to assign the unassigned payment card number to the user account associated with the user as an active payment card number; and
authorizing the payment transaction using the active payment card number, wherein the authorization causes a modification to an account balance of the user account.

19. The one or more computer-readable non-transitory storage media of claim 18, wherein the instructions are further configured to cause one or more processors of the payment service system to perform operations further comprising:

identifying the unassigned payment card number from one or more unassigned payment card numbers received from an issuer processor server.

20. The one or more computer-readable non-transitory storage media of claim 19, wherein the one or more unassigned payment card numbers are stored in the database.

\* \* \* \* \*